United States Patent
Ansari et al.

(10) Patent No.: US 10,328,668 B1
(45) Date of Patent: Jun. 25, 2019

(54) HEAT TRANSFER LABEL ASSEMBLY

(75) Inventors: Saifuddin M. Ansari, West Chester, OH (US); Douglas L. Barnhardt, West Chester, OH (US); Bret Arnone, Mason, OH (US)

(73) Assignee: MCC-Norwood, LLC, Batavia, OH (US)

( * ) Notice: Subject to any disclaimer, the term of this patent is extended or adjusted under 35 U.S.C. 154(b) by 1020 days.

(21) Appl. No.: 12/968,623

(22) Filed: Dec. 15, 2010

Related U.S. Application Data

(60) Provisional application No. 61/305,278, filed on Feb. 17, 2010, provisional application No. 61/379,038, filed on Sep. 1, 2010.

(51) Int. Cl.
| | |
|---|---|
| *B32B 7/06* | (2019.01) |
| *B32B 27/10* | (2006.01) |
| *B32B 27/32* | (2006.01) |
| *C09J 7/00* | (2018.01) |
| *C09J 7/21* | (2018.01) |
| *C09J 7/35* | (2018.01) |
| *C09J 7/20* | (2018.01) |

(52) U.S. Cl.
CPC ............ *B32B 7/06* (2013.01); *B32B 27/10* (2013.01); *B32B 27/32* (2013.01); *C09J 7/201* (2018.01); *C09J 7/21* (2018.01); *C09J 7/35* (2018.01); *B32B 2250/03* (2013.01); *B32B 2391/00* (2013.01); *B32B 2519/00* (2013.01)

(58) Field of Classification Search
CPC ......... B32B 7/06; B32B 2519/00; C09J 7/201
USPC .............................................. 428/32.6, 32.63
See application file for complete search history.

(56) References Cited

U.S. PATENT DOCUMENTS

| | | | |
|---|---|---|---|
| 3,510,341 A | | 5/1970 | Peck |
| 3,516,842 A | * | 6/1970 | Klinker, Jr. et al. ......... 428/40.5 |
| 4,555,436 A | * | 11/1985 | Geurtsen et al. ............. 428/200 |
| 5,573,865 A | | 11/1996 | Steelman |
| 5,607,771 A | * | 3/1997 | Matsuse et al. ............. 428/32.6 |
| 5,741,387 A | | 4/1998 | Coleman |
| 6,210,794 B1 | * | 4/2001 | Nakamura ................. 428/32.79 |
| 6,562,451 B2 | | 5/2003 | Syoda et al. |
| 2003/0072901 A1 | | 4/2003 | Dronzek, Jr. |
| 2003/0098906 A1 | | 5/2003 | Randen et al. |
| 2006/0172094 A1 | | 8/2006 | Shi et al. |
| 2008/0311331 A1 | | 12/2008 | Laprade et al. |
| 2010/0173136 A1 | | 7/2010 | Ansari |

FOREIGN PATENT DOCUMENTS

| | | |
|---|---|---|
| EP | 0879711 A1 | 11/1998 |
| EP | 10 73 1978 | 7/2012 |
| KR | 10-2001-0070263 A | 7/2001 |
| WO | WO 95/06564 A1 | 3/1995 |
| WO | WO 2010/048368 A2 | 4/2010 |
| WO | PCT/US2009/061609 | 5/2010 |
| WO | WO 2010/083116 A2 | 7/2010 |

(Continued)

*Primary Examiner* — Ramsey Zacharia
(74) *Attorney, Agent, or Firm* — Wood Herron & Evans LLP

(57) ABSTRACT

A heat transfer label assembly comprises a label and a carrier for releasably supporting the label. The carrier may comprise paper. A release layer comprising a polymer and wax is disposed between the label and the carrier. The carrier is substantially devoid of a solvent impermeable coating, such that the release layer is disposed directly on the paper.

17 Claims, 1 Drawing Sheet

(56) References Cited

FOREIGN PATENT DOCUMENTS

WO  PCT/US2010/020590    8/2010
WO  PCT/US2009/061609    4/2011
WO  PCT/US2010/020590    7/2011

* cited by examiner

HEAT TRANSFER LABEL ASSEMBLY

CROSS-REFERENCE TO RELATED APPLICATIONS

This application claims the benefit of U.S. Provisional Application No. 61/305,278, filed Feb. 17, 2010, and U.S. Provisional Application No. 61/379,038, filed Sep. 1, 2010, both of which are incorporated by reference in their entirety.

TECHNICAL FIELD

This disclosure is directed generally to a heat transfer label assembly, a method of making and using a heat transfer label assembly, a heat transfer label, and a container including such a heat transfer label.

BACKGROUND

Conventional heat transfer label assemblies typically comprise a carrier on which the label is supported, for example, paper. A release layer or coating, for example, a wax, overlies the carrier. If needed, a protective layer may overlie the release layer to provide protection to the ink when transferred to a container. An adhesive layer or coating may overlie the ink for adhering the ink to the container. The label is transferred to a container by applying heat and pressure to the heat transfer label assembly. The heat softens the release layer and allows the ink (along with the optional primer and/or adhesive) to separate from the carrier, while the application of pressure transfers the ink to the container. The carrier is typically discarded.

In a conventional heat transfer label with a wax release layer, the wax is applied at elevated temperatures as a 100 wt % solids coating (i.e., as a molten wax) in an amount of about 6 to about 8 lb/ream. Unfortunately, this high temperature, high solids, high coat weight application often requires costly specialized equipment. Additionally, the coating process typically needs to be conducted offline to allow for sufficient time for the wax to cool and solidify before being able to print or otherwise apply the remaining layers of the heat transfer label assembly.

To overcome these obstacles, the present inventors developed a release layer composition including a lower solids content that could be applied at lower coat weights at ambient temperature. The composition generally included a solvent and one or more solids for forming the release layer. To prevent the solvent and/or solids from penetrating the paper and, therefore, leaving too little solids on the surface of the paper, the present inventors used a substantially solvent impermeable paper as the carrier, for example, a paper with an electron beam (EB) crosslinked polymer coating on the surface. Since substantially all of the release layer composition was retained on the surface of the polymer coated paper, the weight of the dry release layer (e.g., less than 4 dry lb/ream) was able to be markedly reduced while still providing the desired release characteristics (as compared with a conventional wax release layer).

Despite the success of this heat transfer label assembly, the present inventors recognized that the use of such substantially solvent impermeable papers may be cost prohibitive for some applications. Further, the present inventors observed that the low solids release layer composition was sometimes prone to underdrying. In such instances, when the heat transfer label assembly was wound into a roll, the retained solvent in the release layer would soften the adjacent layers of the heat transfer label assembly slightly, which in turn, led to blocking of the roll (i.e., one side of the heat transfer label assembly sticking to the other side of the heat transfer label assembly) and, therefore, problems with releasing the label during application of the heat transfer label to a container.

Thus, there remains a need for a release layer composition that can be applied at ambient temperature in line with the heat transfer label assembly manufacturing process, where the resulting release layer provides the desired release characteristics for the heat transfer label assembly without blocking. There is also a continuing need for a reduced cost heat transfer label assembly.

SUMMARY

In one aspect, this disclosure is directed generally to a heat transfer label assembly comprising a label, a release layer, and a carrier. The carrier may generally be permeable to solvents, such that at least a portion of the release layer composition is absorbed by and/or adsorbed onto the carrier. In one embodiment, the carrier comprises paper that is free of polymeric coatings that would render the carrier "closed" or impermeable to penetration by the release layer composition.

In some embodiments, the release layer may have a dry coat weight of from about 1 to about 3 lb/ream (lb/3000 sq. ft.), for example, about 2 lb/ream. Despite the use of a solvent permeable substrate, the relatively low coat weight of the release layer has been found to provide the desired release characteristics for the label. This is a surprising result, since it would be expected that the penetration of the carrier by the release layer composition would leave too little release layer on the surface of the carrier to provide the desired release characteristics. Further, the use of less wax in the release layer reduces the "halo" effect often encountered with heat transfer labels. The use of less wax also reduces the amount of wax buildup on the manufacturing equipment.

In another aspect, this disclosure is directed generally to a release layer composition for a heat transfer label assembly. In one embodiment, the release layer composition comprises one or more release layer solids for forming the release layer, and optionally, at least one component that facilitates drying of the composition (e.g., a drying agent). The composition may include additional components. Other features and aspects of the invention will be apparent from the following description and the accompanying figures.

BRIEF DESCRIPTION OF THE DRAWINGS

The description refers to the accompanying drawings in which like reference characters refer to like parts throughout the several views, and in which.

DESCRIPTION

Figure 1A:
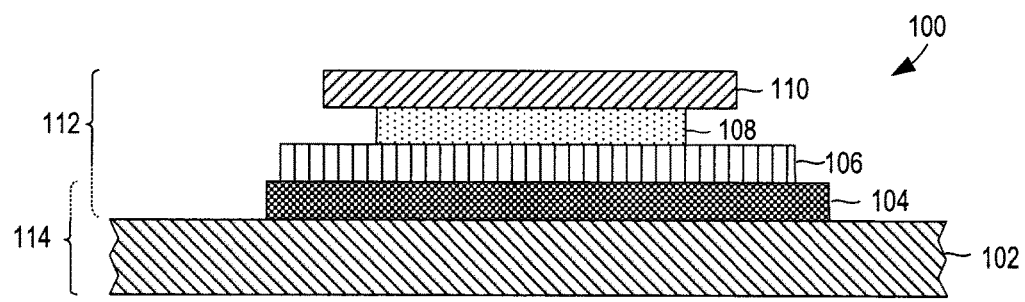
FIG. 1A is a schematic cross-sectional view of an exemplary heat transfer label assembly, including a heat transfer label.
Figure 1B:
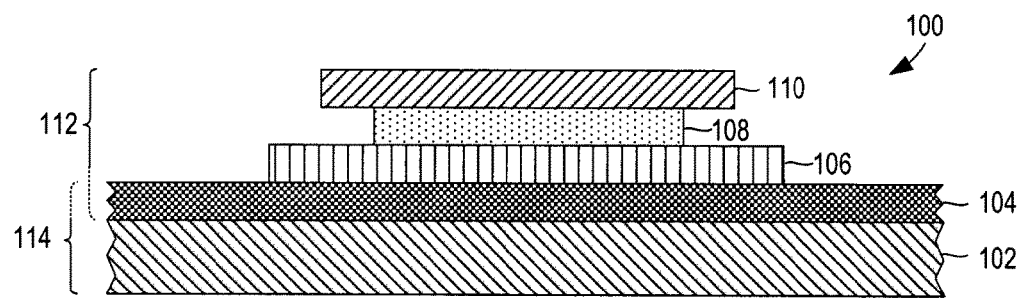
FIG. 1B is a schematic cross-sectional view of another exemplary heat transfer label assembly, including a heat transfer label.

FIGS. 1A and 1B schematically illustrate variations of an exemplary heat transfer label assembly 100, with the relative widths of the various layers generally indicating the relative area of each layer in the structure. It will be understood that the relative thicknesses of the various layers may be altered or exaggerated for purposes of illustration, and that such thicknesses are not indicative of actual or relative thicknesses of actual structures.

Figure 1C:
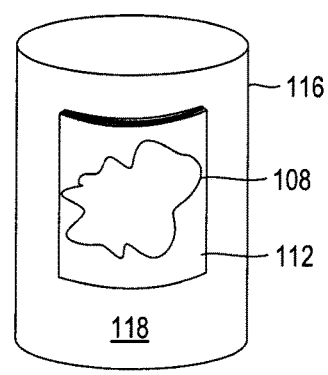
FIG. 1C is a schematic perspective view of a container decorated with the heat transfer label of FIG. 1A or FIG. 1B.

As shown in FIGS. 1A and 1B, the heat transfer label assembly 100 generally includes a plurality of layers including a carrier or substrate 102, a release layer 104, an optional protective layer or coating 106 (e.g., protective lacquer), ink 108, and an adhesive or adhesive layer 110. Each component or layer 102, 104, 106, 108, 110 is in a substantially facing, contacting relationship with the respective adjacent component(s) or layer(s). The release layer 104 may overlie the carrier 102 in approximately the same shape/area as the label graphics (i.e., the ink 108), as shown schematically in FIG. 1A, or may comprise a substantially continuous layer (i.e., a flood coat), as shown schematically in FIG. 1B. Layers 106, 108, 110 and, in some cases, a portion of layer 104, generally define a label 112 or "a transfer portion" 112 of the heat transfer label assembly 100, with the remainder of layer 104 and the carrier 102 defining a "support portion" 114 of the heat transfer label assembly 100. When the label 112 is joined to a container 116 (FIG. 1C), the adhesive 110 generally contacts the exterior surface 118 of the container 116.

A plurality of labels 112 may be indexed along the length of the carrier 102 so that a multitude of containers 116 can be decorated using an automated process. It will be noted that the figures illustrate only one of such labels 112.

To use the heat transfer label assembly 100 according to one exemplary method, the heat transfer label assembly 100 may be brought into intimate contact with the surface 118 of the container 116 with the adhesive 110 facing the container 116. Heat and pressure may be applied to the assembly 100. The release layer 104 softens and allows the protective layer or coating 106, ink 108, and adhesive 110 to separate from the carrier 102, while the application of pressure transfers the protective layer 106, ink 108 and adhesive 110 to the container 118. Additionally, at least some of the release layer 104 may transfer to the container 118. Thus, the outermost layer of the transferred label 112 may comprise protective layer 106 and/or some of the release layer 104. The carrier 102 may be discarded if desired. Alternatively, it is contemplated that the carrier 102 may be recycled or reused.

Various materials may be used to form each layer of the heat transfer label assembly 100, and each layer may have various basis weights or coat weights, depending on the particular application.

The substrate or carrier 102 may generally comprise a base material on which the remaining layers of the heat transfer label assembly 100 are supported. Accordingly, some layers may be described as "overlying" or being "on" other layers. However, it will be appreciated that the heat transfer label assembly 100 may be inverted, such that the carrier 102 overlies the other layers. Accordingly, such terminology is provided merely for convenience of explanation and not limitation in any manner.

The carrier 102 may generally comprise a flexible material, for example, paper. The paper may include a clay coating on one or both sides. The paper may have a basis weight of from about 5 to about 75 lb/ream (i.e., lb/3000 sq. ft.), for example, about 10 to about 50 lb/ream, for example, from about 20 to about 30 lb/ream, for example, about 35 lb/ream. However, other ranges and basis weights are contemplated.

In one aspect, the carrier may generally be solvent permeable. As used herein, a solvent permeable carrier comprises a carrier that is substantially devoid or free of (i.e., has not been provided with) polymer or polymeric coatings or layers that render the paper substantially solvent impermeable. Examples of such coatings or layers may include, but are not limited to, thermoplastic polymers (e.g., polyolefins such as polyethylene, acrylic resins, etc.), thermoset polymers (e.g., ultraviolet light (UV) cured coatings, EB-cured coatings, epoxy resins, etc.), or any combination thereof. (It will be noted that conventional clay coatings and other similar paper treatments are not considered to be solvent impermeable coatings or layers as described herein.) A solvent permeable carrier, (i.e., a carrier that is substantially devoid of a solvent impermeable coating) may generally have a greater porosity, permeability, water vapor transmission rate (WVTR), oxygen transmission rate, and/or oil penetration than the same paper with a solvent impermeable coating.

By way of example, and not limitation, the carrier may have a porosity (e.g., as measured using a Parker Print-Surf Porosity Tester) of at least about 0.28 ml/min, and in each of various examples, the carrier may have a porosity of at least about 0.30 ml/min, at least about 0.35 ml/min, at least about 0.40 ml/min, at least about 0.45 ml/min, at least about 0.50 ml/min, at least about 0.55 ml/min, at least about 0.60 ml/min, at least about 0.65 ml/min, at least about 0.70 ml/min, or at least about 0.75 ml/min. In some examples, the carrier may have a porosity of from about 0.395 to about 0.777 ml/min, from about 0.40 to about 0.78 ml/min, from about 0.50 to about 0.65 ml/min, or from about 0.55 to about 0.60 ml/min. In one particular example, the carrier may have a porosity of about 0.59 ml/min. However, other possibilities are contemplated.

As another example, the carrier may have an oil drop absorption (e.g., as measured using TAPPI T 462 om-01) of less than about 45 min, and in each of various examples, the carrier may have an oil absorption of less than about 40 min, less than about 35 min, less than about 30 min, less than about 25 min, less than about 20 min, less than about 15 min, or less than about 10 min. In some examples, the carrier may have an oil drop absorption of from about 5 to about 10 min, from about 5.5 min to about 9.5 min, or from about 7 to about 8 min. In one particular example, the carrier may have an oil drop absorption of about 7.5 min. However, other possibilities are contemplated.

As still another example, the carrier may have a WVTR (e.g., as measured using ASTM E 96/E 96M-05) of at least about 26 g/h m$^2$, and in each of various examples, the carrier may have a WVTR of at least about 30 g/h m$^2$, at least about 35 g/h m$^2$, at least about 40 g/h m$^2$, at least about 45 g/h m$^2$, or at least about 50 g/h m$^2$. In some examples, the carrier may have a WVTR of from about 40 to about 60 g/h m$^2$, from about 45 to about 55 g/h m$^2$, from about 49 to about 52 g/h m$^2$, or from about 50 to about 51 g/h m$^2$. In one particular example, the carrier may have a WVTR of about 50.6 g/h m$^2$. However, other possibilities are contemplated.

The release layer 104 may generally comprise a lacquer or any other suitable material that releases readily from the carrier 102 upon sufficient exposure to heat. In one example, the release layer 104 may comprise a polymer or polymeric material (e.g., at least one polymer or polymeric material) and a wax (e.g., at least one wax).

Any suitable polymer and/or wax may be used. For example, the polymer may comprise a polyolefin or an olefin copolymer, for example, an undecanoic acid copolymer. One example of an undecanoic acid copolymer that may be suitable is X-6112 polymer from Baker Hughes, Barnsdall, Okla. However, other polymers may be used. The wax may comprise carnauba wax, and more particularly, in one example, the wax may comprise micronized carnauba wax. One example of a micronized carnauba wax that may be suitable is MICROKLEAR 418 Micronized Carnauba Wax, Micro Powders, Inc., Tarrytown, N.Y. However, other waxes and types of waxes may be used. The polymer and wax may be present in any suitable relative amounts. In one example, the polymer and wax may be present in a ratio of from about 3:1 to about 1:3 by weight, for example, from about 2.5:1 to about 1.5:1, for example, about 2:1. However, numerous other components and relative amounts of such components may be used.

As with the various other layers of the assembly 100, the release layer 104 may be present in any suitable amount needed to achieve the desired printing and/or release characteristics. In one example, the release layer 104 may have a dry weight of less than about 4 lb/ream, for example, from about 0.5 to about 3.5 lb/ream, or from about 1 to about 3 lb/ream, for example, about 2 lb/ream, or as another example, about 2.5 lb/ream. However, other ranges and amounts are contemplated.

The release layer 104 may be deposited on or applied to the carrier 102 using any suitable technique, for example, using a solvent, water, or UV flexographic or gravure process. In one example, the release layer 104 may be applied to the carrier 102 at ambient temperature as a relatively low solids composition. In each of various examples, the composition may include less than 100 wt % solids (polymer or polymeric material plus wax), for example, less than 90 wt % solids, less than 80 wt % solids, less than 70 wt % solids, less than 60 wt % solids, less than 40 wt % solids, less than 30 wt % solids, less than about 27 wt % solids, less than about 25 wt % solids, or less than about 22 wt % solids. In some embodiments, the composition may include from about 20 wt % to about 30 wt % solids, for example, from about 22 to about 27 wt % solids. In one particular embodiment, the composition may include about 27 wt % solids. In another particular embodiment, the composition may include about 22 wt % solids. However, countless other possibilities are contemplated.

By way of example, and not limitation, one exemplary release layer composition may include:
  about 73 parts solvent; and
  about 27 parts release layer solids.

In another example, the release layer composition may include a polymer, wax, a solvent, and optionally, an optical brightener. More particularly, the release layer composition may include:
  about 73 parts solvent;
  about 18 parts polymer or polymeric material;
  about 9 parts wax; and
  trace amount of optical brightener.

For example, the release layer composition may include:
  about 73.1 parts solvent;
  about 17.8 parts polymer or polymeric material;
  about 9 parts wax; and
  about 0.1 parts optical brightener.

Even more particularly, one exemplary release layer composition may include:
  about 73.1 parts toluene (solvent);
  about 17.8 parts olefin copolymer;
  about 9 parts micronized carnauba wax; and
  about 0.1 parts D-298 columbia blue optical brightener, where the olefin copolymer may be an undecanoic acid copolymer (as described above), or any other suitable polymer or polymeric material.

Where additional drying is needed, for example, to assist with reducing blocking, the release layer composition may include a diluent that may also serve as a drying agent. For example, one exemplary release layer composition may include:
  about 60 parts solvent;
  about 22 parts release layer solids; and
  about 18 parts diluent/drying agent.

In another example, the release layer composition may include:
  about 60 parts solvent;
  about 15 parts polymer or polymeric material;
  about 7 parts wax;
  about 18 parts diluent/drying agent; and
  trace amount of optical brightener.

In one particular example, the release layer composition may include:
  about 59.9 parts solvent;
  about 14.6 parts polymer or polymeric material;
  about 7.4 parts wax;
  about 18.0 parts diluent/drying agent; and
  about 0.1 parts optical brightener.

More particularly still, one exemplary release layer composition may include:
  about 59.9 parts toluene (solvent);
  about 14.6 parts olefin copolymer;
  about 7.4 parts micronized carnauba wax;
  about 18.0 parts ethyl alcohol (diluents/drying agent); and
  about 0.1 parts D-298 columbia blue optical brightener, where the olefin copolymer may be an undecanoic acid copolymer (as described above), or any other suitable polymer or polymeric material.

The present inventors have found that the addition of the diluent may improve drying of the release layer 104 and, therefore, reduce the amount of the retained solvent in the heat transfer label assembly 100, as compared with a release layer composition without the diluent. As a result, the heat transfer label assembly 100 may tend to exhibit less blocking, and therefore, may have fewer defects when transferring the label 110 to the container 112 during the decorating process.

Notably, in each of the above examples, the release layer 104 directly overlies the paper 102 without an intervening solvent impermeable layer (e.g., a solvent impermeable polymer layer). Although it would be expected that the release layer composition would be absorbed into the paper and be rendered ineffective, the present inventors have discovered that a release layer comprising a polymer and wax provides the desired release properties, even at a significantly lower coat weights than traditional wax release layers. Further, the present inventors have demonstrated that a release layer composition including a polymer and a wax (e.g., at least one polymer and at least one wax) on paper without a solvent impermeable layer provides better release characteristics than the same release layer composition applied to paper with a solvent impermeable coating (see Example 1). This results in a significant cost reduction over both conventional heat transfer label assemblies that use a 100% wax release layer, and heat transfer label assemblies that use a coated (i.e., substantially solvent impermeable) paper as the carrier.

While not wishing to be bound by theory, it is believed that as the release layer composition dries, the polymer may form a film-like barrier that may assist with preventing significant absorption of the wax into the paper. Thus, it is believed that ample wax remains on the surface of the paper for releasing the label from the container. While some exemplary release layer compositions are provided, it will be appreciated that countless other compositions are contemplated by the disclosure. Other solvents, release layer solids, diluents/drying agents, and other components may be used. Additionally, the relative amounts of each component may vary for each application. If desired, the release layer composition may include other components, for example, solvents and/or other additives (e.g., optical brighteners, processing aids, printing aids, and so on).

Returning to the figures, the protective layer or coating 106 may comprise any suitable material that serves as a protective overcoat for the ink when the ink 108 is transferred to a container. In some examples, the protective layer or coating 106 may comprise a polymer or polymeric material, for example, a polyamide, a polyester, a modified acrylic polymer, or any other suitable material. The protective layer 106 may be applied in any suitable manner and may have any suitable dry weight, for example, from about 1 to about 1.5 lb/ream.

The ink 108 may be applied as one or more layers, as needed or desired for a particular application. For example, where the ink 108 is to be applied to a colored container 116, the ink 108 may include a first layer (adjacent to the release layer 104) including the graphic content, and a second layer (between the first layer of ink and the adhesive 110) of white ink or ink of any other suitable background color. Other configurations are contemplated.

The ink 108 may be applied using any suitable process, for example, using a solvent, water, or UV flexographic process. Alternatively, the ink 108 may be applied using a solvent or water based gravure process. Alternatively still, the ink 108 may be applied using a digital printing process. Other suitable techniques may be used.

The adhesive 110 may generally comprise a thermally activated adhesive that is capable of adhering the ink to the surface 118 of the container 116. The type of adhesive used may vary depending on the type of container being used. For example, when the container is polyethylene, one suitable adhesive may be a polyamide adhesive. Alternatively, when the container is glass, one suitable adhesive may be a polyester adhesive. Numerous other possibilities are contemplated.

The amount of adhesive used may vary for each application. In some embodiments, the adhesive may have a dry weight from about 0.5 to about 3 lb/ream, for example, from about 1 to about 1.5 lb/ream. As shown in FIG. 1A, the adhesive 110 may generally be applied in register with the ink 108 to be transferred to the container 116 and also may extend beyond the peripheral margin of the ink 110 to ensure complete transfer of the ink 108 to the container 118. The adhesive may be applied to the ink using any suitable process, for example, by solvent or water based flexographic or gravure printing.

Numerous variations are contemplated by this disclosure. Thus, while specific structure or assembly 100 is illustrated schematically in FIG. 1A and FIG. 1B, it will be appreciated that each heat transfer label assembly may vary for each application. Layers may be added or omitted as needed. Other modifications are contemplated.

The present invention may be understood further in view of the following Examples, which are not intended to be limiting in any manner.

EXAMPLE 1

A trial was conducted to prepare heat transfer label assemblies using different carriers.

First, a heat transfer label assembly was made using a carrier comprising an about 35 lb/ream C1S paper (clay coated on one side) from NewPage Corporation (Miami, Ohio) with an electron-beam crosslinked polymer coating on one side (provided by Coating Excellence, Inc., Appleton, Wis. as "35#C1SBLCH/2#EBC"). About 2 lb/ream of the following release layer composition was applied to the carrier and dried in an oven at a temperature of from about 230° F. to about 250° F. for about 2 to 4 seconds:
 about 59.9 parts toluene;
 about 14.6 parts X-6112 olefin copolymer (Baker Hughes, Barnsdall, Okla.);
 about 7.4 parts MICROKLEAR 418 micronized carnauba wax (Micro Powders, Inc., Tarrytown, N.Y.);
 about 18.0 parts ethyl alcohol; and
 about 0.1 parts D-298 columbia blue optical brightener.

A conventional protective lacquer, ink, and adhesive were then sequentially applied to the release layer in a conventional manner. The resulting heat transfer label assembly was wound into a roll. When used to decorate containers, the heat transfer label exhibited some blocking, which resulted in some defects in the decorated container.

Next, a heat transfer label assembly was made using a carrier comprising an about 35 lb/ream C1S paper (clay coated on one side) from NewPage Corporation (Miami, Ohio). The same release layer composition was applied as above and dried in the same manner. The same protective lacquer, ink, and adhesive were then applied to the release layer. The resulting heat transfer label assembly was wound into a roll. When used to decorate containers, the heat transfer label exhibited no blocking, and therefore, no defects in the decorated container.

EXAMPLE 2

Several materials were tested for various physical properties. The results are presented in Table 1, where:
 Sample A=about 35 lb/ream C1S paper (clay coated on one side) from NewPage Corporation (Miami, Ohio) with an electron-beam crosslinked polymer coating on one side (provided by Coating Excellence, Inc., Appleton, Wis. as "35#C1SBLCH/2#EBC");
 Sample B=about 35 lb/ream C1S paper (clay coated on one side) from NewPage Corporation (Miami, Ohio); and
 Sample C=about 35 lb/ream C1S paper (clay coated on one side) from NewPage Corporation (Miami, Ohio) with about 2 lb/ream of a release layer on one side, where the release layer included olefin copolymer (believed to be an undecanoic acid copolymer) and micronized carnauba wax in a ratio of about 2:1.

TABLE 1

|  | Sample A | Sample B | Sample C |
| --- | --- | --- | --- |
| Parker Print-Surf Porosity (ml/min); n = 10 | 0.190 ± 0.049 | 0.586 ± 0.191 | 0.233 ± 0.039 |
| Oil Drop Absorption (min:sec) (TAPPI T 462 om-01); n = 5 | >45:00 | 7:26 ± 1:58 | >45:00 |
| WVTR (g/h m$^2$); (ASTM E 96/E 96M-05; 38° C. and uncontrolled humidity); n = 5 | 24.9 ± 0.95 | 50.6 ± 1.05 | 2.54 ± 0.371 |

Although certain embodiments of this invention have been described with a certain degree of particularity, those skilled in the art could make numerous alterations without departing from the spirit or scope of this invention. Any directional references (e.g., upper, lower, upward, downward, left, right, leftward, rightward, top, bottom, above, below, vertical, horizontal, clockwise, and counterclockwise) are used only for identification purposes to aid the reader's understanding of various embodiments, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be recognized by those skilled in the art, that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit of the invention. The detailed description set forth herein is not intended nor is to be construed to limit the present invention or otherwise to exclude any such other embodiments, adaptations, variations, modifications, and equivalent arrangements of the present invention.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention.

While the present invention is described herein in detail in relation to specific examples or aspects, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is not intended nor is to be construed to limit the present invention or otherwise to exclude any such other embodiments, adaptations, variations, modifications, and equivalent arrangements of the present invention.

What is claimed is:

1. A heat transfer label assembly comprising:
a label;
a carrier for releasably supporting the label, the carrier comprising paper; and
a release layer disposed between the label and the carrier, the release layer comprising a polymer and wax, wherein the polymer is an undecanoic acid copolymer, and wherein the release layer has a dry weight of from about 1 to about 3 lb/ream of carrier,
wherein the carrier is substantially devoid of a solvent impermeable coating, such that the release layer is disposed directly on the paper.

2. The heat transfer label assembly of claim 1, wherein the carrier has a porosity of from about 0.395 to about 0.777 ml/min.

3. The heat transfer label assembly of claim 1, wherein the release layer has an oil drop absorption of from about 5 to about 10 min.

4. The heat transfer label assembly of claim 1, wherein the release layer comprises the polymer and wax in a ratio of from about 3:1 to about 1:3 by weight.

5. The heat transfer label assembly of claim 1, wherein the release layer comprises the polymer and wax in a ratio of about 2:1.

6. The heat transfer label assembly of claim 1, wherein the wax comprises micronized carnauba wax.

7. The heat transfer label assembly of claim 1, wherein the label comprises
adhesive for securing the label to a container, the adhesive being distal from the release layer, ink, and
optionally, a protective layer disposed between the ink and the release layer.

8. The heat transfer label assembly of claim 1, wherein the paper of the carrier has a porosity of at least about 0.28 ml/min, an oil drop absorption of less than about 45 min, and a water vapor transmission rate of at least about 26 g/h m$^2$.

9. A heat transfer label assembly comprising;
a label;
a carrier for releasably supporting the label, the carrier comprising a solvent permeable paper; and
a release layer disposed between the label and the carrier, the release layer having a dry weight of less than about 4 lb/ream, wherein the release layer includes a weight ratio of polymer to wax in a range from 3:1 to 1:3;
wherein the polymer is an undecanoic acid copolymer.

10. The heat transfer label assembly of claim 9, wherein the release layer is disposed directly adjacent to the carrier with no intervening layers.

11. The heat transfer label assembly of claim 9, wherein the carrier has a water vapor transmission rate of from about 40 to about 60 g/h m2.

12. The heat transfer label assembly of claim 9, wherein the release layer has a dry weight of from about 1 to about 3 lb/ream of carrier.

13. The heat transfer label assembly of claim 9, wherein the carrier has an oil drop absorption of from about 5 to about 10 min.

14. The heat transfer label assembly of claim 9, wherein the release layer comprises the polymer and wax in a ratio of about 2:1.

15. The heat transfer label assembly of claim 9, wherein the wax comprises micronized carnauba wax.

16. The heat transfer label assembly of claim 9, wherein the label comprises
adhesive for securing the label to an article, the adhesive being distal from the release layer,
ink, and
optionally, a protective layer disposed between the ink and the release layer.

17. The heat transfer label assembly of claim 9, wherein the carrier has a porosity of at least about 0.28 ml/min, an oil drop absorption of less than about 45 min, and a water vapor transmission rate of at least about 26 g/h m$^2$.

* * * * *

UNITED STATES PATENT AND TRADEMARK OFFICE
CERTIFICATE OF CORRECTION

PATENT NO. : 10,328,668 B1
APPLICATION NO. : 12/968623
DATED : June 25, 2019
INVENTOR(S) : Saifuddin M. Ansari et al.

It is certified that error appears in the above-identified patent and that said Letters Patent is hereby corrected as shown below:

In the Specification

Column 6, Lines 47-48, "wax provides the desired release properties, even at a significantly lower cost weights than traditional wax release"   should read   --wax provides the desired release properties, even at significantly lower cost weights than traditional wax release--

In the Claims

Claim 7, Column 10, Lines 17-19, "...adhesive for securing the label to a container, the adhesive being distal from the release layer, ink, and optionally, a protective layer disposed between the ink and the release layer."   should read   --adhesive for securing the label to a container, the adhesive being distal from the release layer, ink, and optionally, a protective layer disposed between the ink and the release layer--

Claim 11, Column 10, Line 39, "... 40 to about 60 g/h m2."   should read   --40 to about 60 g/h $m^2$--

Signed and Sealed this
Thirty-first Day of March, 2020

Andrei Iancu
*Director of the United States Patent and Trademark Office*